(12) United States Patent
Droppers

(10) Patent No.: US 10,940,961 B2
(45) Date of Patent: Mar. 9, 2021

(54) SMALL SATELLITE PROPULSION SYSTEM

(71) Applicant: Ventions, LLC, San Francisco, CA (US)

(72) Inventor: Lloyd J. Droppers, Auckland (NZ)

(*) Notice: Subject to any disclaimer, the term of this patent is extended or adjusted under 35 U.S.C. 154(b) by 1397 days.

(21) Appl. No.: 14/994,376

(22) Filed: Jan. 13, 2016

(65) Prior Publication Data

US 2016/0200457 A1    Jul. 14, 2016

Related U.S. Application Data

(60) Provisional application No. 62/103,204, filed on Jan. 14, 2015.

(51) Int. Cl.
*B64G 1/40* (2006.01)
*F02K 9/88* (2006.01)
(Continued)

(52) U.S. Cl.
CPC .............. *B64G 1/402* (2013.01); *B64G 1/401* (2013.01); *F02K 9/42* (2013.01); *F02K 9/58* (2013.01);
(Continued)

(58) Field of Classification Search
CPC .......... B64G 1/10; B64G 1/401; B64G 1/402; F02K 9/64; F02K 9/42; F02K 9/58; F02K 9/88
(Continued)

(56) References Cited

U.S. PATENT DOCUMENTS 5,417,049 A * 5/1995 Sackheim .............. B64G 1/401
244/169
5,651,515 A * 7/1997 Saccoccia .............. B64G 1/007
244/158.5

(Continued)

FOREIGN PATENT DOCUMENTS

CA     2354658 A1 * 2/2003  ............ B64D 27/16
EP     0919464 A1 * 6/1999  ............ B64G 1/26
(Continued)

OTHER PUBLICATIONS

Small Satellite Propulsion; CU Aerospace; downloaded Jan. 12, 2016; https://web.archive.org/web/20140810141928/http://www.cuaerospace.com/Products/SmallSatellitePropulsion.aspx; published Oct. 8, 2014.

*Primary Examiner* — Richard R. Green
*Assistant Examiner* — Aaron M Rodziwicz
(74) *Attorney, Agent, or Firm* — Keith L. Jenkins, Registered Patent Attorney, LLC; Keith L. Jenkins

(57) ABSTRACT

A small satellite propulsion system using a gaseous oxidizer and a gaseous fuel as primary propellants with a liquid as a film coolant for the inner surface of the rocket motor. The gaseous fuel is also used as a pressurant for the coolant and as a cold gas propellant for attitude control system (hereinafter "ACS") thrusters. The oxidizer, fuel, and coolant tanks, as well as most valves and plumbing, are integrated into a single core unit along with the rocket motor, rocket motor plumbing, and safety valves. Attitude control thrusters may be remotely located with plumbing to the fuel tank. The core unit is four inches high and less than four inches deep and wide. The small satellite propulsion system uses no pyrotechnics and no hazardous toxic materials.

19 Claims, 11 Drawing Sheets

(51) Int. Cl.
*F02K 9/64* (2006.01)
*F02K 9/58* (2006.01)
*F02K 9/42* (2006.01)
*B64G 1/10* (2006.01)

(52) U.S. Cl.
CPC .............. *F02K 9/64* (2013.01); *F02K 9/88* (2013.01); *B64G 1/10* (2013.01); *F05D 2250/80* (2013.01); *F05D 2260/202* (2013.01)

(58) Field of Classification Search
USPC ...................................................... 244/171.1
See application file for complete search history.

(56) References Cited

U.S. PATENT DOCUMENTS

| | | | | |
|---|---|---|---|---|
| 6,113,032 | A * | 9/2000 | Cochran | B64G 1/14 244/135 R |
| 6,135,393 | A * | 10/2000 | Sackheim | B64G 1/26 244/169 |
| 8,735,788 | B2 * | 5/2014 | Preston | F42B 15/10 244/3.1 |
| 9,018,572 | B2 * | 4/2015 | Facciano | F42B 10/663 244/3.22 |
| 9,796,486 | B1 * | 10/2017 | Illsley | B64G 1/26 |
| 2004/0026572 | A1 * | 2/2004 | Burton | B64G 1/401 244/171.1 |
| 2004/0216818 | A1 * | 11/2004 | Lundstrom | C06B 47/00 149/1 |
| 2008/0256924 | A1 * | 10/2008 | Pederson | F02K 9/50 60/245 |
| 2009/0007541 | A1 * | 1/2009 | Kawaguchi | F02K 9/42 60/220 |
| 2009/0120060 | A1 * | 5/2009 | Coste | F02K 9/50 60/257 |
| 2011/0240801 | A1 * | 10/2011 | Manzoni | B64G 1/1021 244/171.1 |
| 2014/0026537 | A1 * | 1/2014 | Eilers | F02K 9/24 60/251 |
| 2014/0203148 | A1 * | 7/2014 | Barthoulot | F02K 9/50 244/171.1 |
| 2014/0260186 | A1 * | 9/2014 | Bahn | F02K 9/42 60/257 |
| 2014/0283499 | A1 * | 9/2014 | Sannino | F02K 9/46 60/204 |
| 2015/0027102 | A1 * | 1/2015 | Bahn | F02K 9/425 60/258 |
| 2015/0128563 | A1 * | 5/2015 | Anflo | F23R 3/30 60/260 |
| 2015/0337763 | A1 * | 11/2015 | Vuillamy | F02K 9/46 60/221 |
| 2016/0290284 | A1 * | 10/2016 | Caratge | F02K 9/50 |
| 2017/0254296 | A1 * | 9/2017 | Weldon | F02K 9/972 |
| 2018/0051679 | A1 * | 2/2018 | Khachan | B64G 1/405 |
| 2018/0135562 | A1 * | 5/2018 | Shigley | F02K 9/97 |

FOREIGN PATENT DOCUMENTS

| | | | | |
|---|---|---|---|---|
| FR | | 2991300 A1 * | 12/2013 | ............ B64G 1/242 |
| WO | WO-2010036291 A2 * | | 4/2010 | ............ B64G 1/401 |
| WO | WO-2014108649 A1 * | | 7/2014 | ............ F02K 9/46 |
| WO | WO-2015031699 A2 * | | 3/2015 | ............ B64G 1/24 |

* cited by examiner

SMALL SATELLITE PROPULSION SYSTEM

RELATIONSHIP TO OTHER APPLICATIONS

The present application claims the benefit of U.S. provisional patent application Ser. No. 62/103,204 filed Jan. 14, 2015 to the same inventors.

STATEMENT REGARDING FEDERALLY SPONSORED RESEARCH AND DEVELOPMENT

This invention was made with government support under Phase I SBIR contract NNX14CP20P awarded by NASA. The government has certain rights in the invention.

FIELD OF ART

The present invention relates to a propulsion system for a small satellite, such as a three-unit or six-unit (3U, 6U, or larger) cubesat. The present invention more particularly relates to a propulsion system for a small satellite that does not use any pyrotechnics or any hazardous toxic materials.

BACKGROUND OF THE INVENTION

Cubesats are a variety of small satellite having a standard size and shape. While the illustrated embodiment below is oriented toward a cubesat, other types of small satellites may also use the present invention. The inventive small satellite propulsion system strikes a balance between high performance (which typically mandates use of toxic propellants such as hydrazine, peroxide or ammonia) and safety mandates (that limit use of pressurized chemical propellants), and seeks to overcome technical and programmatic constraints for onboard cubesat propulsion. The technical challenge is to realize such propulsion in a suitably small volume, especially once tanks, thrusters, valves, controls, etc. are added. The programmatic challenge in cubesat propulsion is also complicated by design guidelines that presently prohibit pyrotechnics, pressure vessels over 1.2 atmospheres, use of hazardous materials, and storage of more than 100 W-Hrs of chemical energy.

SUMMARY OF THE INVENTION

Briefly described, the invention includes a small satellite propulsion system using a gaseous oxidizer and a gaseous fuel as primary propellants with a liquid as a film coolant for the inner surface of the rocket motor. The gaseous fuel is also used as a pressurant for the coolant and as a cold gas propellant for attitude control system (hereinafter "ACS") thrusters. The oxidizer, fuel, and coolant tanks, as well as most valves and plumbing, are integrated into a single core unit along with the rocket motor, rocket motor plumbing, and safety valves. Attitude control thrusters may be remotely located with plumbing to the fuel tank. The core unit is four inches high and less than four inches deep and wide. The small satellite propulsion system uses no pyrotechnics and no hazardous toxic materials.

In exemplary embodiments, the invention includes a small satellite propulsion system including: a gaseous fuel tank; a gaseous oxidizer tank; a liquid coolant tank; and a rocket motor in valve-controlled fluid communication with the gaseous fuel tank, the gaseous oxidizer tank, and the liquid coolant tank, where the rocket motor is fixed within an elongated enclosure including at least one side formed, at least in part, by the gaseous fuel tank, the gaseous oxidizer tank, and/or the liquid coolant tank. That small satellite propulsion system, including a piston in the liquid coolant tank, responsive to a pressurant on a first side of the piston to exert pressure on a liquid coolant in the liquid coolant tank when the small satellite propulsion system is fueled, filled, and activated. That small satellite propulsion system, including valve-controlled fluid communication between the gaseous fuel tank and the liquid coolant tank adapted to supply gaseous fuel as the pressurant when the small satellite propulsion system is fueled, filled, and activated. That small satellite propulsion system, including valve-controlled fluid communication between the gaseous fuel tank and an attitude control system adapted to use gaseous fuel in cold-gas attitude control system thrusters when the small satellite propulsion system is fueled, filled, and activated. That small satellite propulsion system, where the gaseous fuel includes gaseous methane, the gaseous oxidizer includes gaseous oxygen, and the liquid coolant includes ethanol and water. That small satellite propulsion system, where the liquid coolant tank contains a pressure no greater than 1.2 atmospheres when the small satellite propulsion system is fueled and filled. That small satellite propulsion system, where the gaseous fuel tank, the gaseous oxidizer tank, and the liquid coolant tank together contain no more than 100 Watt-hours of chemical energy when the small satellite propulsion system is fueled and filled. That small satellite propulsion system, including no pyrotechnics. That small satellite propulsion system, including no hazardous toxic materials when the gaseous fuel tank, the gaseous oxidizer tank, and the liquid coolant tank are filled. That small satellite propulsion system, where the valve-controlled fluid communication includes: gas valve-controlled fluid communication with the rocket motor, further including: first and second isolation valves in fluid communication with the respective GOX and GCH4 tanks; first and second gas regulation valves in fluid communication with the first and second respective isolation valves; first and second run valves in fluid communication with the first and second respective gas regulation valves; first and second check valves in fluid communication with the first and second respective run valves; first and second flow venturies in fluid communication with the first and second respective check valves; and a rocket motor injector in fluid communication with the first and second flow venturies; gas valve-controlled fluid communication with the attitude control system thrusters, further including: the second isolation valve; the second gas regulation valve; four thruster run valves in fluid communication with the second gas regulation valve; and four thrusters in fluid communication with the respective four thruster run valves; gas valve-controlled fluid communication with the coolant tank, further including: the second isolation valve; the second gas regulation valve; a pressurant run valve in fluid communication with the second gas regulation valve; and a pressurant side of the piston in the coolant tank in fluid communication with the pressurant run valve; and liquid valve-controlled fluid communication, further including a third isolation valve in fluid communication with the coolant tank; a third run valve in fluid communication with the third isolation valve; a third check valve in fluid communication with the third run valve; and the rocket motor injector in fluid communication with the third check valve.

A small satellite propulsion system including: a gaseous fuel tank; a gaseous oxidizer tank; a liquid coolant tank; a rocket motor in valve-controlled fluid communication with the gaseous fuel tank, the gaseous oxidizer tank, and the liquid coolant tank, where the rocket motor is fixed within an elongated enclosure including at least one side formed, at least in part, by the gaseous fuel tank, the gaseous oxidizer tank, and/or the liquid coolant tank; a piston in the liquid coolant tank, responsive to a pressurant on a first side of the piston to exert pressure on a liquid coolant in the liquid coolant tank when the small satellite propulsion system is fueled, filled, and activated; and valve-controlled fluid communication between the gaseous fuel tank and the liquid coolant tank adapted to supply gaseous fuel as the pressurant when the small satellite propulsion system is fueled, filled, and activated. That small satellite propulsion system, including valve-controlled fluid communication between the gaseous fuel tank and an attitude control system adapted to use gaseous fuel in cold-gas attitude control system thrusters when the small satellite propulsion system is fueled, filled, and activated. That small satellite propulsion system, where the gaseous fuel tank, the gaseous oxidizer tank, and the liquid coolant tank each contains a pressure no greater than 1.2 atmospheres when the small satellite propulsion system is fueled and filled. That small satellite propulsion system, where the gaseous fuel includes gaseous methane, the gaseous oxidizer includes gaseous oxygen, and the liquid coolant includes ethanol and water. That small satellite propulsion system, where the gaseous fuel tank, the gaseous oxidizer tank, and the liquid coolant tank together contain no more than 100 Watt-hours of chemical energy when fueled and filled. That small satellite propulsion system, including: no pyrotechnics, no hazardous toxic materials when the gaseous fuel tank, the gaseous oxidizer tank, and the liquid coolant tank are fueled and filled. That small satellite propulsion system, where the valve-controlled fluid communication includes at least one of: gas valve-controlled fluid communication, further including: first and second isolation valves in fluid communication with the respective GOX and GCH4 tanks; first and second gas regulation valves in fluid communication with the first and second respective isolation valves; first and second run valves in fluid communication with the first and second gas regulation valves; first and second check valves in fluid communication with the first and second run valves; first and second flow venturies in fluid communication with the first and second check valves; and a rocket motor injector in fluid communication with the first and second flow venturies; and a third isolation valve in fluid communication with the coolant tank; a third run valve in fluid communication with the third isolation valve; a third check valve in fluid communication with the third run valve; and the rocket motor injector in fluid communication with the third check valve.

A small satellite propulsion system including: a gaseous fuel tank; a gaseous oxidizer tank; a liquid coolant tank; a rocket motor in valve-controlled communication with the gaseous fuel tank, the gaseous oxidizer tank, and the liquid coolant tank, where the rocket motor is fixed within an elongated enclosure including at least one side formed, at least in part, by at least one of the gaseous fuel tank, the gaseous oxidizer tank, and the liquid coolant tank; a piston in the liquid coolant tank, responsive to a pressurant on a first side of the piston to exert pressure on a liquid coolant in the liquid coolant tank when the small satellite propulsion system is fueled, filled, and activated; valve-controlled fluid communication between the gaseous fuel tank and the liquid coolant tank adapted to supply gaseous fuel as the pressurant when the small satellite propulsion system is fueled, filled, and activated; and valve-controlled fluid communication between the gaseous fuel tank and an attitude control system adapted to use gaseous fuel in cold-gas attitude control system thrusters when the small satellite propulsion system is fueled, filled, and activated. That small satellite propulsion system, where the valve-controlled fluid communication includes at least one of: gas valve-controlled fluid communication with the rocket motor, further including: first and second isolation valves in fluid communication with the respective GOX and GCH4 tanks; first and second gas regulation valves in fluid communication with the first and second respective isolation valves; first and second run valves in fluid communication with the first and second respective gas regulation valves; first and second check valves in fluid communication with the first and second respective run valves; first and second flow venturies in fluid communication with the first and second respective check valves; and a rocket motor injector in fluid communication with the first and second flow venturies; gas valve-controlled fluid communication with the attitude control system thrusters, further including: the second isolation valve; the second gas regulation valve; four thruster run valves in fluid communication with the second gas regulation valve; and four thrusters in fluid communication with the respective four thruster run valves; gas valve-controlled fluid communication with the coolant tank, further including: the second isolation valve; the second gas regulation valve; a pressurant run valve in fluid communication with the second gas regulation valve; and a pressurant side of the piston in the coolant tank in fluid communication with the pressurant run valve; and liquid valve-controlled fluid communication, further including a third isolation valve in fluid communication with the coolant tank; a third run valve in fluid communication with the third isolation valve; a third check valve in fluid communication with the third run valve; and the rocket motor injector in fluid communication with the third check valve. That small satellite propulsion system, where the gaseous fuel tank, the gaseous oxidizer tank, and the liquid coolant tank each contains a pressure no greater than 1.2 atmospheres when the small satellite propulsion system is fueled and filled; the gaseous fuel tank, the gaseous oxidizer tank, and the liquid coolant tank together contain no more than 100 Watt-hours of chemical energy when small satellite propulsion system is fueled and filled; small satellite propulsion system includes: no pyrotechnics; and no hazardous toxic materials.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

Figure 1:
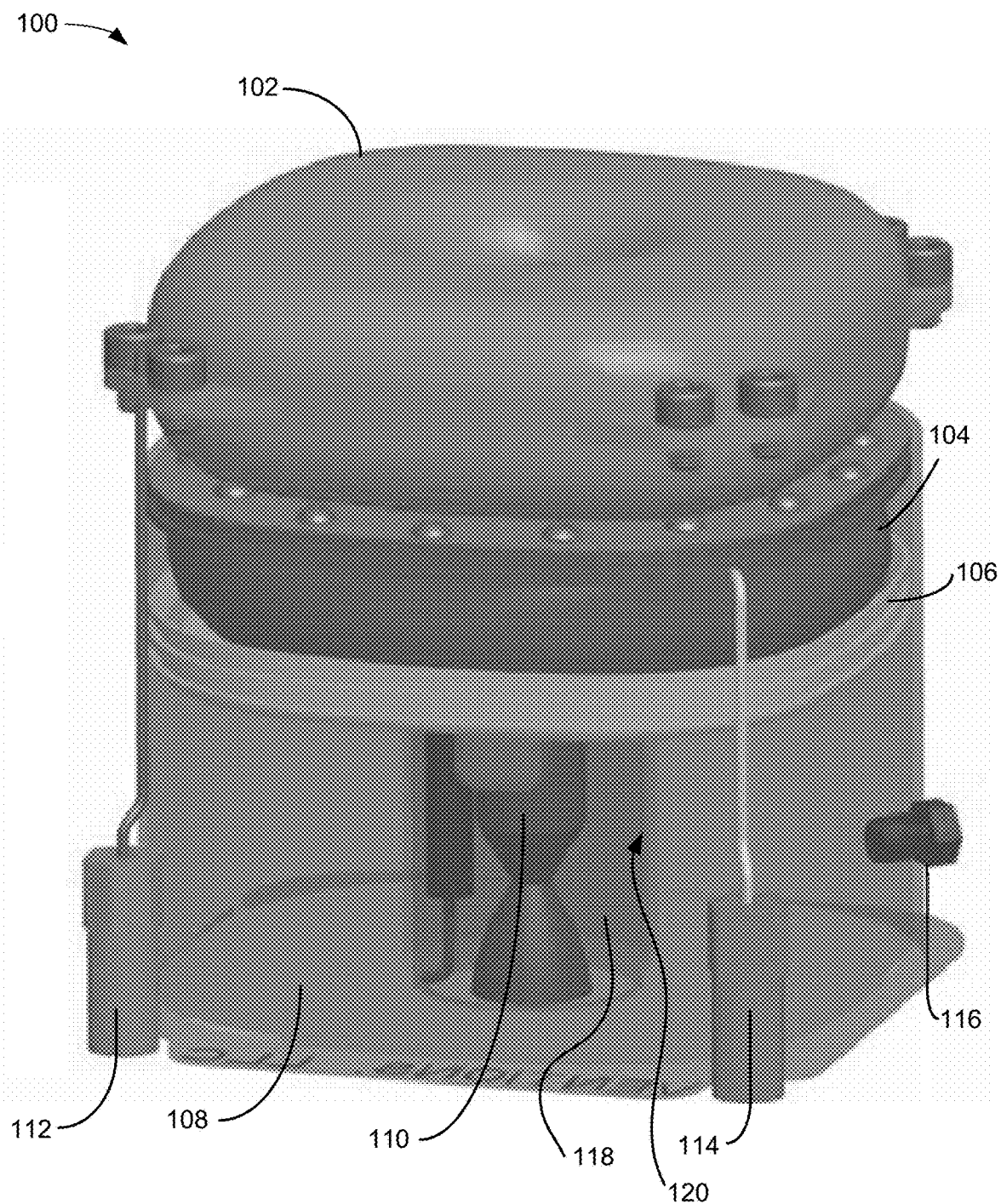
FIG. 1 is a perspective view, with partial transparency, illustrating an exemplary embodiment of the small satellite propulsion system core unit, according to a preferred embodiment of the present invention.

FIG. 1 is a perspective view, with partial transparency, illustrating an exemplary embodiment of the small satellite propulsion system 300 (see FIG. 3) core unit 100, according to a preferred embodiment of the present invention. Core unit 100 includes toroidal gaseous Oxygen (hereinafter "GOX") tank 102 mounted on toroidal gaseous methane (hereinafter "GCH4") tank 104 that is mounted on annular coolant tank 108. The open centers of the toroidal tanks 102 and 104, as well as the open center of annular coolant tank 108 houses valves and plumbing, discussed in further detail below, and the rocket motor 110.

In another embodiment of the system, to be discussed further below, the toroidal tanks may be replaced by longitudinal tanks. In other embodiments, nitrous oxide may be used as an oxidizer. In other embodiment, gaseous ethane may be used as a fuel.

The coolant is a mixture of ethanol and water. The coolant is stored as an unpressurized liquid for film cooling of the chamber of the rocket motor 110, and operates with a depressed freezing point down to −30° C. After deployment, annular coolant tank 108 is pressurized by gas from the GCH4 tank 104 via a high-density polyethylene (hereinafter "HDPE") piston 106 to provide injection pressure to create a cooling film stream on the inner walls of rocket motor 110. The coolant is injected though a peripheral arrangement of coolant ports in the injector of the rocket motor 110. The coolant may also be injected into the side walls of the chamber upstream of the nozzle for transpiration cooling, or circulate through cooling channels in the walls of the thruster in a cooled-nozzle configuration for a rocket engine. COTS burst disk pressure relief valve 116 for the annular coolant tank 108 provides an ASME compliant factor of safety to allow for realization of a safe flight-ready system. Thruster cavity 118 is an elongated enclosure having at least one side 120 formed, at least in part, by at least one of the coolant tank 108, the GCH4 tank 104, and the GOX tank 102.

The toroidal GOX and GCH4 tanks 102 and 104 are each machined from solid 7075-T6 aluminum as two separate pieces and fastened together using O-ring seals. In other embodiments, other materials of similar functional characteristics may be used for forming the tanks 102 and 104. Alternatively, the longitudinal tanks may be milled into a structural aluminum or other metal block. The toroidal GOX and GCH4 tanks 102 and 104 are installed as inert, sealed components with burst disk relief valves designed for a factor of safety of four (equivalent to ASME code). GOX tank 102 is filled through GOX fill valve 112, which is preferably a quick-disconnect GOX fill valve 112. GCH4 tank 104 is filled through GCH4 fill valve 114, which is preferably a quick-disconnect GCH4 fill valve 114. The core unit 100 of the illustrated embodiment is preferably four inches in height.

Figure 2:
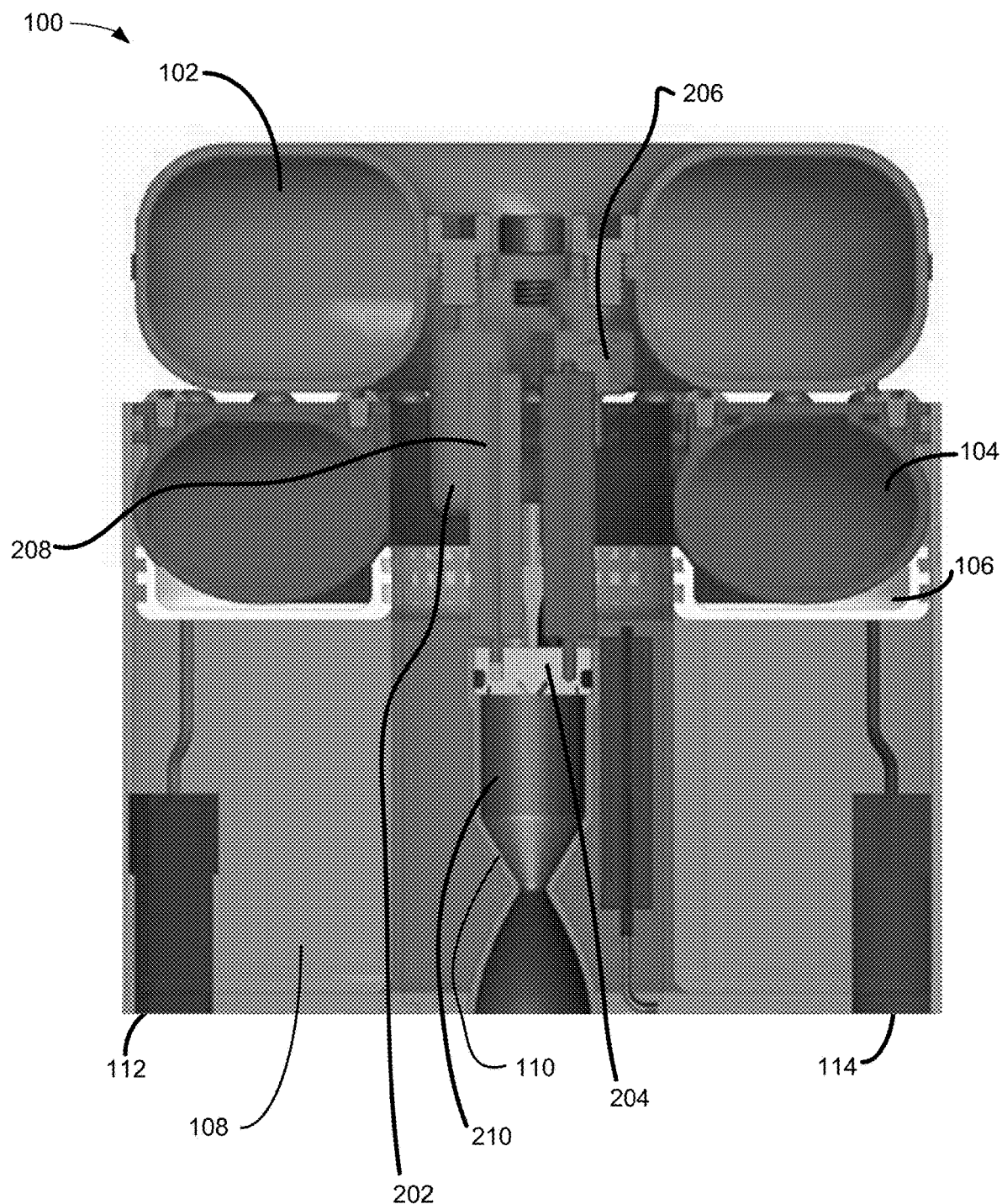
FIG. 2 is a front elevation cross section view illustrating an exemplary embodiment of the small satellite propulsion system core unit of FIG. 1, according to a preferred embodiment of the present invention.

FIG. 2 is a front elevation cross section view illustrating an exemplary embodiment of the small satellite propulsion system 300 (see FIG. 3) core unit 100 of FIG. 1, according to a preferred embodiment of the present invention. Within the center space of the toroidal tanks 102 and 104, an isolation valve 202 is installed above the rocket motor 110. Isolation valves 202 (one of three is visible in this view) utilize a motor-driven screw to pierce a positive fluid isolation barrier on each of the methane and oxygen tanks 104 and 102 once the small satellite propulsion system 300 (see FIG. 3) is ready to be activated in orbit. Injector 204 is mounted atop the rocket motor 110 and includes a manifold for directing coolant, GOX and GCH4 into the combustion chamber 210 of the rocket motor 110. Also shown is a rocket motor pressure transducer 206 for the combustion chamber 210 that is used in a control system (not shown) for the small satellite propulsion system 300. Also shown is the GOX run valve 208. GOX run valve 208 is the operational oxidizer control valve.

Figure 3:
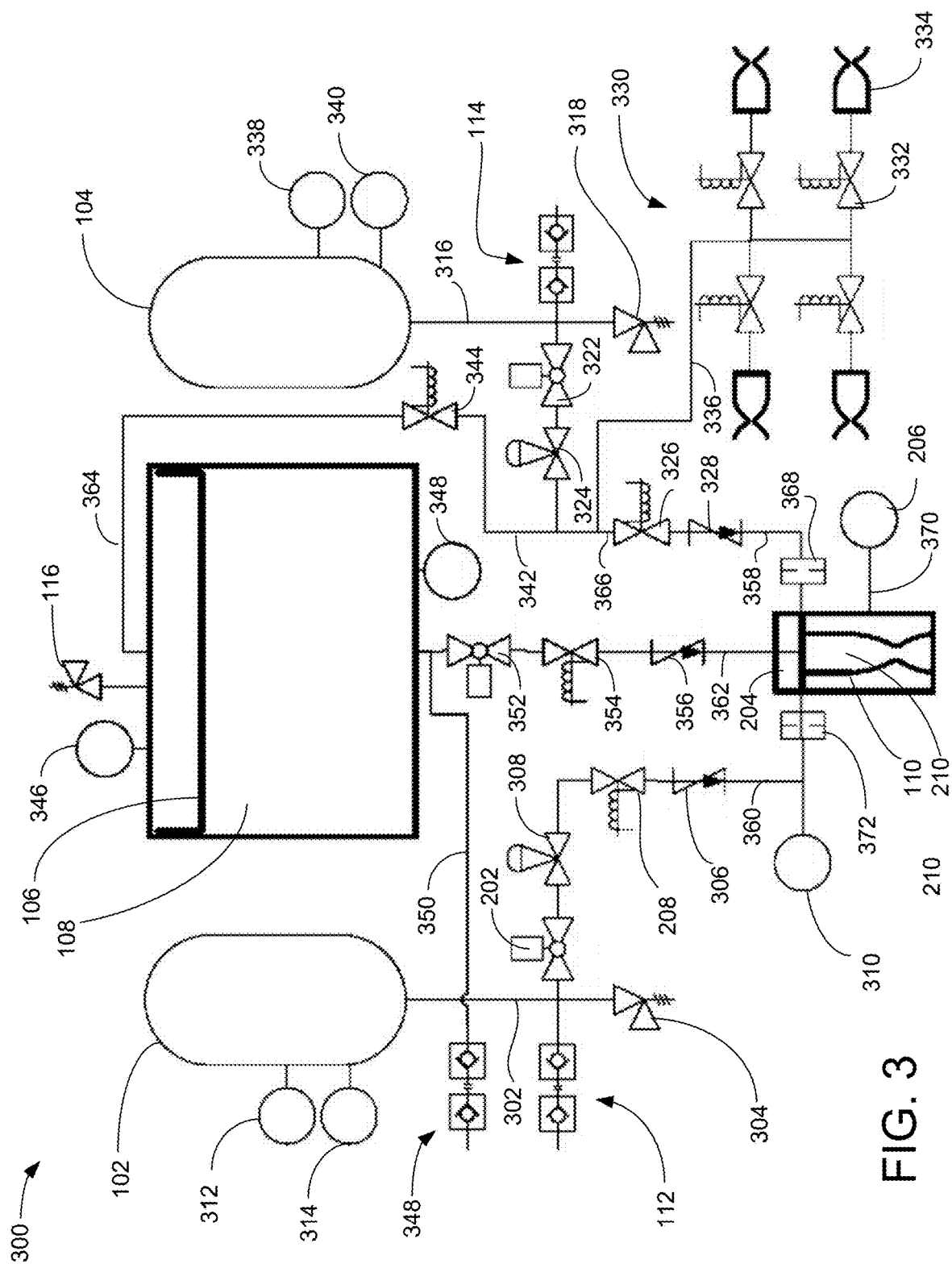
FIG. 3 is a plumbing and instrumentation diagrammatic view illustrating an exemplary embodiment of the small satellite propulsion system, according to a preferred embodiment of the present invention.

FIG. 3 is a plumbing and instrumentation diagrammatic view illustrating an exemplary embodiment of the small satellite propulsion system 300, according to a preferred embodiment of the present invention. GOX tank 102 has a GOX tank temperature transducer 312 and a GOX tank pressure transducer 314 providing outputs to a control system (not shown). Main GOX line 302 is filled before launch through quick-disconnect GOX fill valve 112, as described above. GOX relief valve 304 is preferably a burst disc GOX relief valve 304, similar to burst disk pressures relief valve 116, as described above. GOX isolation valve 202 is a single-use valve that opens the main GOX line 302 to the rocket motor 110 when the small satellite propulsion system 300 is deployed in outer space. GOX gas regulation valve 308 provides a regulated outlet pressure. GOX run valve 208, discussed above, is a solenoid controlled GOX run valve 208 that operates based on the control system (not shown) sending control signals to the solenoid. GOX check valve 306 prevents back pressure from the rocket motor 110 from reaching main GOX line 302. The output of GOX check valve 306 is a controlled flow of GOX in GOX controlled line 360 to the GOX flow venturi 372 and then to the injector 204 and thence into the combustion chamber 210 of rocket motor 110. GOX line pressure transducer 310, similar to GOX tank pressure transducer 314, discussed above, provides pressure data to the control system (not shown) regarding the pressure of GOX at the injector 204. Rocket motor pressure transducer 206 provides pressure data regarding the pressure inside of combustion chamber 210 of rocket motor 110 via rocket motor pressure transducer line 370.

Coolant is loaded into annular coolant tank 108 through quick disconnect fill valve 348 and coolant main line 350. Annular coolant tank 108 has a burst disk pressure relief valve 116, as discussed above, a coolant pressure transducer 346, a coolant temperature transducer 348, and a pressurant input line 364. During operation, HDPE piston 106 applies pressure, during operation, to the coolant in annular coolant tank 108. Coolant exits annular coolant tank 108 through main coolant line 350 to coolant isolation valve 352, which is similar to GOX isolation valve 202, discussed above. The flow through coolant isolation valve 352 goes to coolant run valve 354, similar to GOX run valve 208 discussed above, which is controlled by control inputs to the solenoid. Coolant check valve 356, similar to GOX check valve 306 discussed above, passes coolant unidirectionally along coolant controlled flow line 362 to the rocket motor 110 and prevents pressure from the rocket motor 110 from backing up into the annular coolant tank 108.

GCH4 tank 104 has a GCH4 temperature transducer 338 and a GCH4 pressure transducer 340 to supply inputs to the control system (not shown). GCH4 exits GCH4 tank 104 through GCH4 main line 316. GCH4 tank 104 is filled via quick disconnect GCH4 fill valve 114, similar to the GOX quick disconnect fill valve 112 discussed above. GCH4 tank 104 has a GCH4 burst disk relief valve 318, similar to the GOX burst disk relief valve 304 discussed above, connected via GCH4 main line 316. GCH4 flow from GCH4 tank 104 is through GCH4 isolation valve 322 that is similar to GOX isolation valve 202 discussed above. GCH4 gas regulation valve 324, similar to GOX gas regulation valve 308 discussed above, supplies regulated pressure to the GCH4 pressurant line 342, to the GCH4 ACS cold gas monopropellant line 336, and to the rocket motor fuel line 366.

GCH4 pressurant line 342 couples to GCH4 pressurant run valve 344 (similar to GOX run valve 208, discussed above). GCH4 pressurant run valve 344 is controlled by control system (not shown) signals to the solenoid. In operation, controlled GCH4 pressurant flow is conducted along coolant controlled pressurant input line 364 to annular coolant tank 108 to apply force to HDPE piston 106.

In the GCH4 ACS thruster assembly 330, ACS cold gas monopropellant line 336 conducts regulated GCH4 to GCH4 ACS thrusters 334 (one of four labeled) via respective GCH4 ACS thruster run valves 332 (one of four labeled), similar to the GOX run valve 208 discussed above. The ACS thrusters 334 are not part of the core unit 100, but are remotely located on the satellite to provide small amounts of thrust for attitude control and station keeping. In a particular embodiment, more than four ACS thrusters 334 and their respective run valves 332 may be used.

Rocket motor fuel line 366 supplies pressure regulated GCH4 to GCH4 run valve 326 (similar to GOX run valve 208, discussed above), which controls the flow of GCH4 fuel to rocket motor 110 via GCH4 check valve 328 (similar to GOX check valve 306, discussed above), GCH4 injector 204 (similar to GOX injector 204, discussed above), GCH4 controlled line 358 and GCH4 flow venturi 368.

Figure 4:
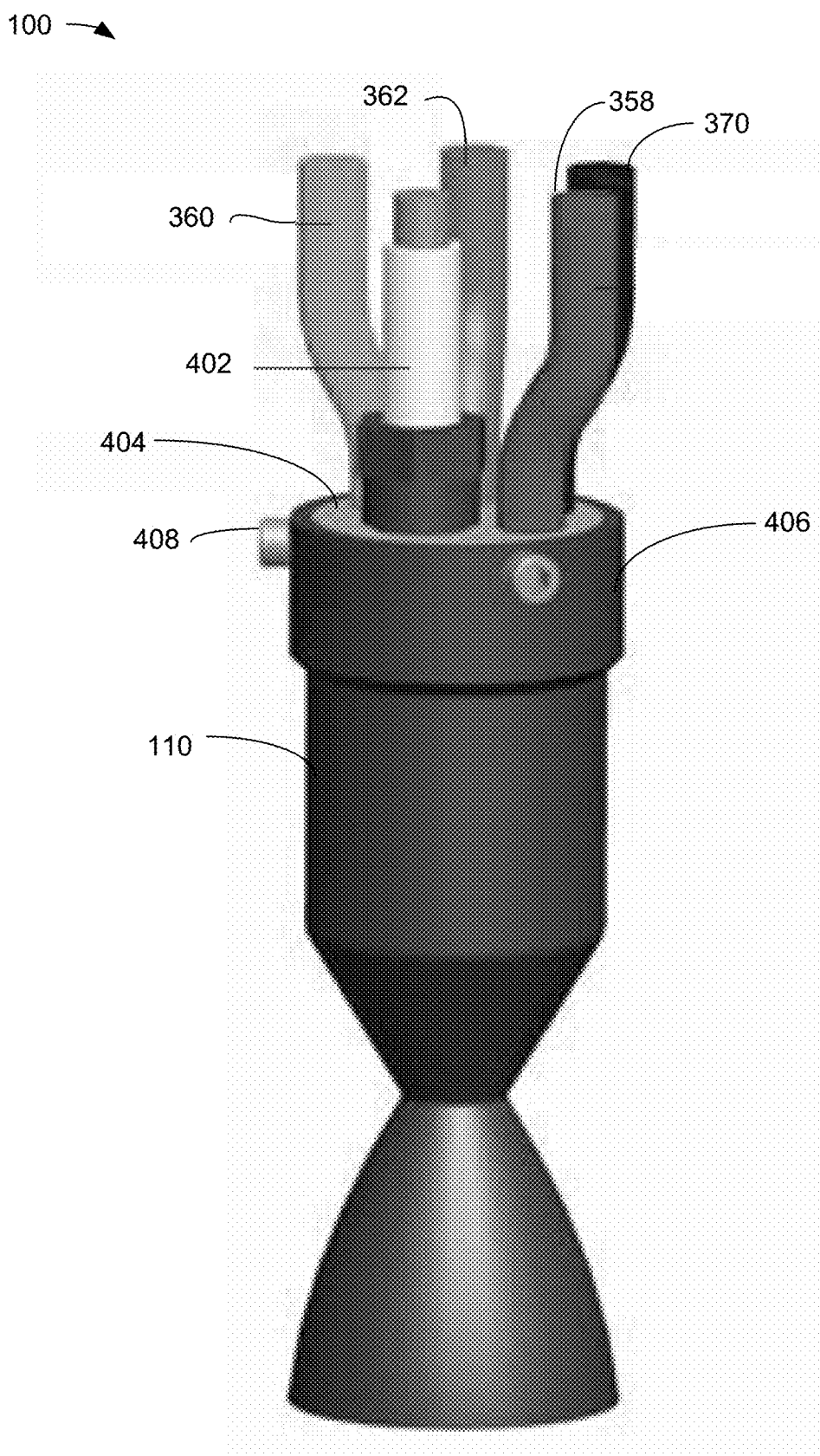
FIG. 4 is a perspective view illustrating an exemplary embodiment of the rocket motor and thrust chamber test article in the small satellite propulsion system, according to a preferred embodiment of the present invention.

FIG. 4 is a perspective view illustrating an exemplary embodiment of an exemplary rocket motor 110 and thrust chamber test article 610 of the small satellite propulsion system 300, according to a preferred embodiment of the present invention. Rocket motor 110 is approximately one and three-quarters of an inch high in the illustrated embodiment. A top rocket motor portion 406 houses interface plug 404, which is secured in the top rocket motor portion 406 by set screws 408 (two of four visible in this view, one of two labeled). The injector 204, not shown in this view, holds the terminations of the rocket motor pressure transducer line 370, the GOX controlled line 360, the GCH4 controlled line 358, and the coolant controlled flow line 362. Also held in the injector 204 is a miniature spark plug igniter 402, which ignites the GOX/GCH4 mixture in the rocket motor 110 during operation.

Figure 5:
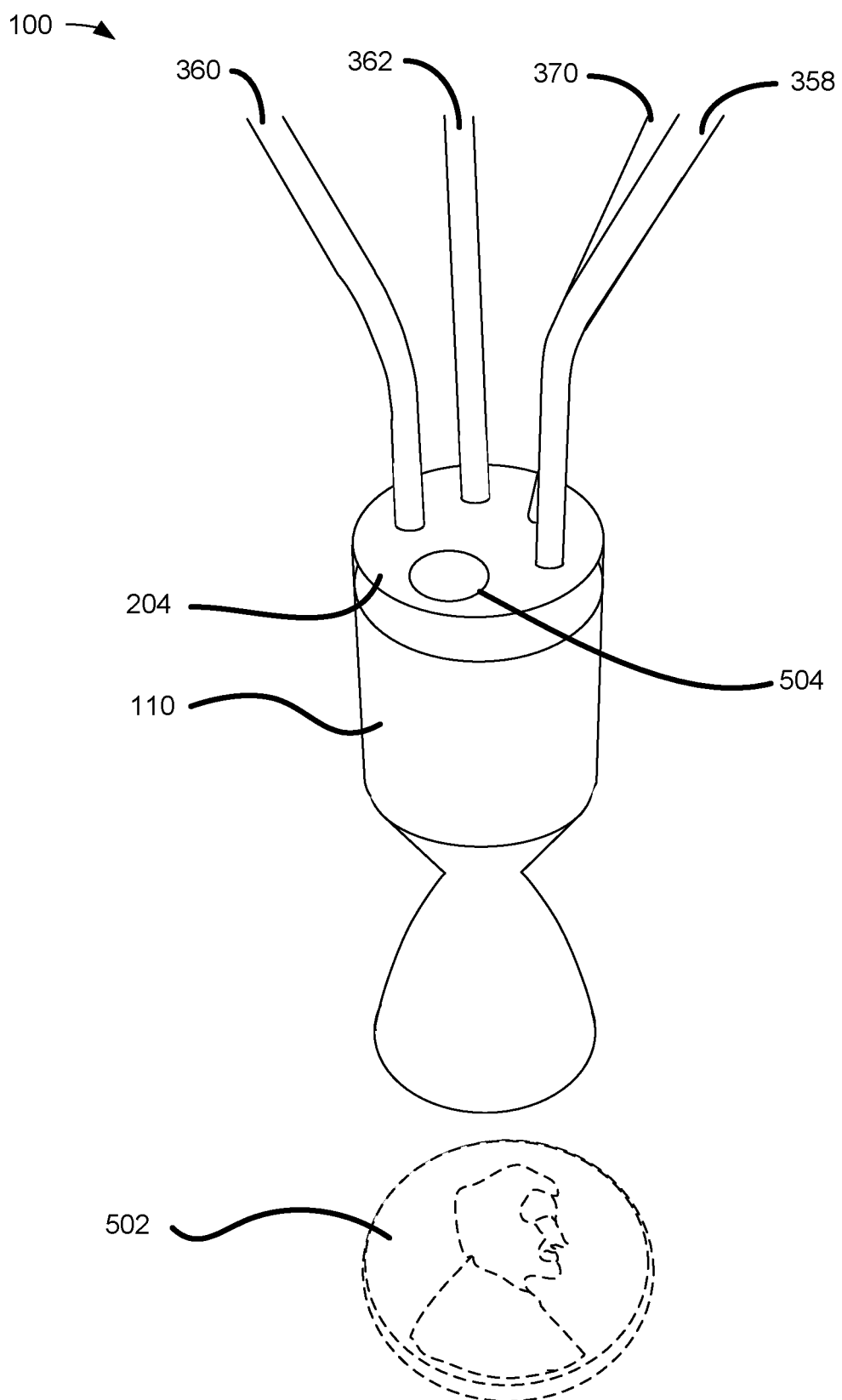
FIG. 5 is a perspective view illustrating an exemplary embodiment of the rocket motor and thrust chamber test article in the small satellite propulsion system, according to a preferred embodiment of the present invention.

FIG. 5 is a perspective view illustrating an exemplary embodiment of the rocket motor 110 and thrust chamber test article 610 in the small satellite propulsion system 300, according to a preferred embodiment of the present invention. The injector 204 holds the terminations of the rocket motor pressure transducer line 370, the GOX controlled line 360, the GCH4 controlled line 358, and the coolant controlled flow line 362. Also visible is the threaded bore 504 for installing the miniature spark plug igniter 402. US penny 502 is included for size comparison.

Figure 6:
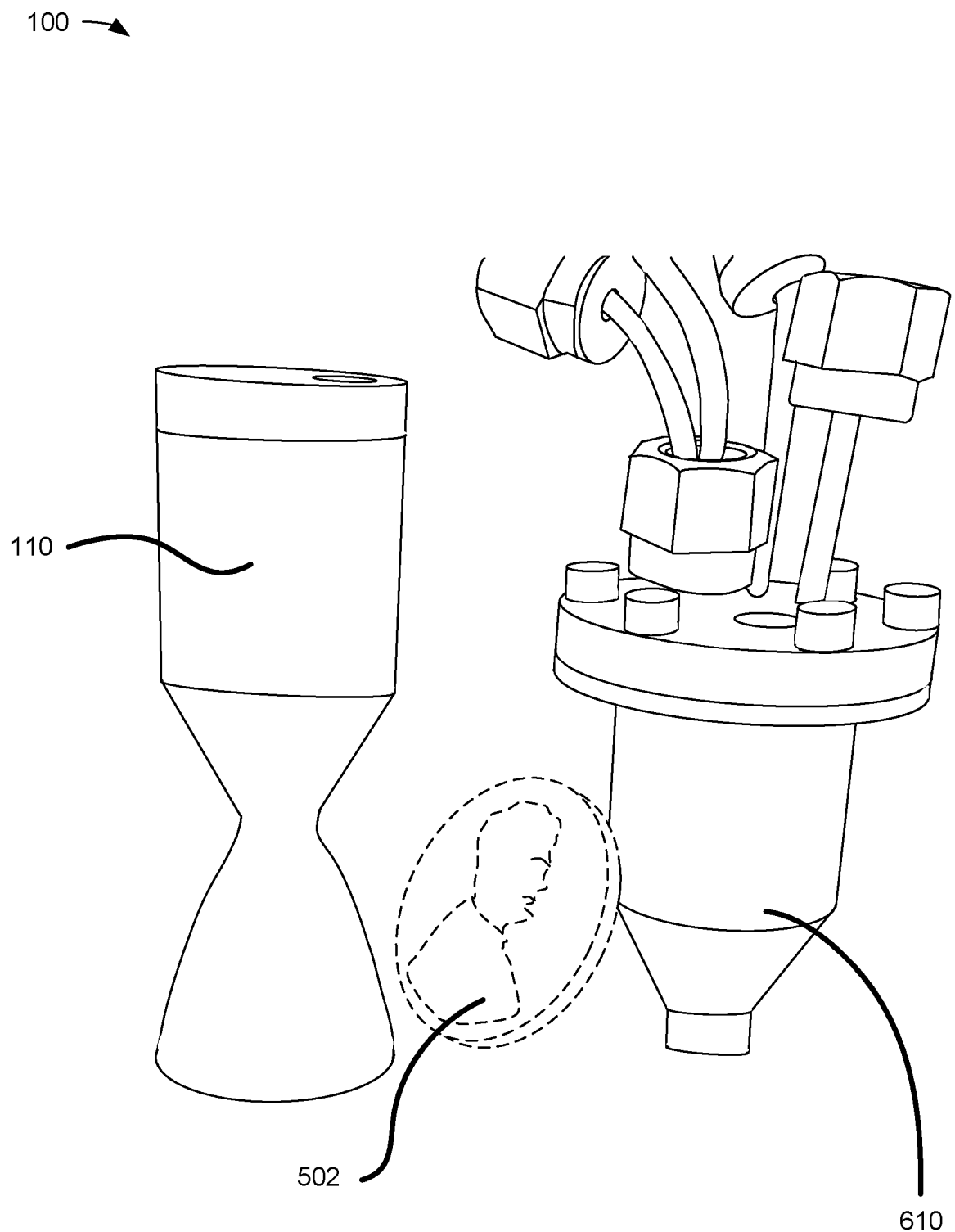
FIG. 6 is an additional perspective view illustrating an exemplary embodiment of the rocket motor and the thrust chamber test article in the small satellite propulsion system, according to a preferred embodiment of the present invention.

FIG. 6 is an additional perspective view illustrating an exemplary embodiment of the rocket motor 110 and the thrust chamber test article 610 in the small satellite propulsion system 300, according to a preferred embodiment of the present invention. Thrust chamber test article 610 is shown with four pipes and nuts and a flanged support for the plumbing. US penny 502 is included for size comparison.

Figure 7:
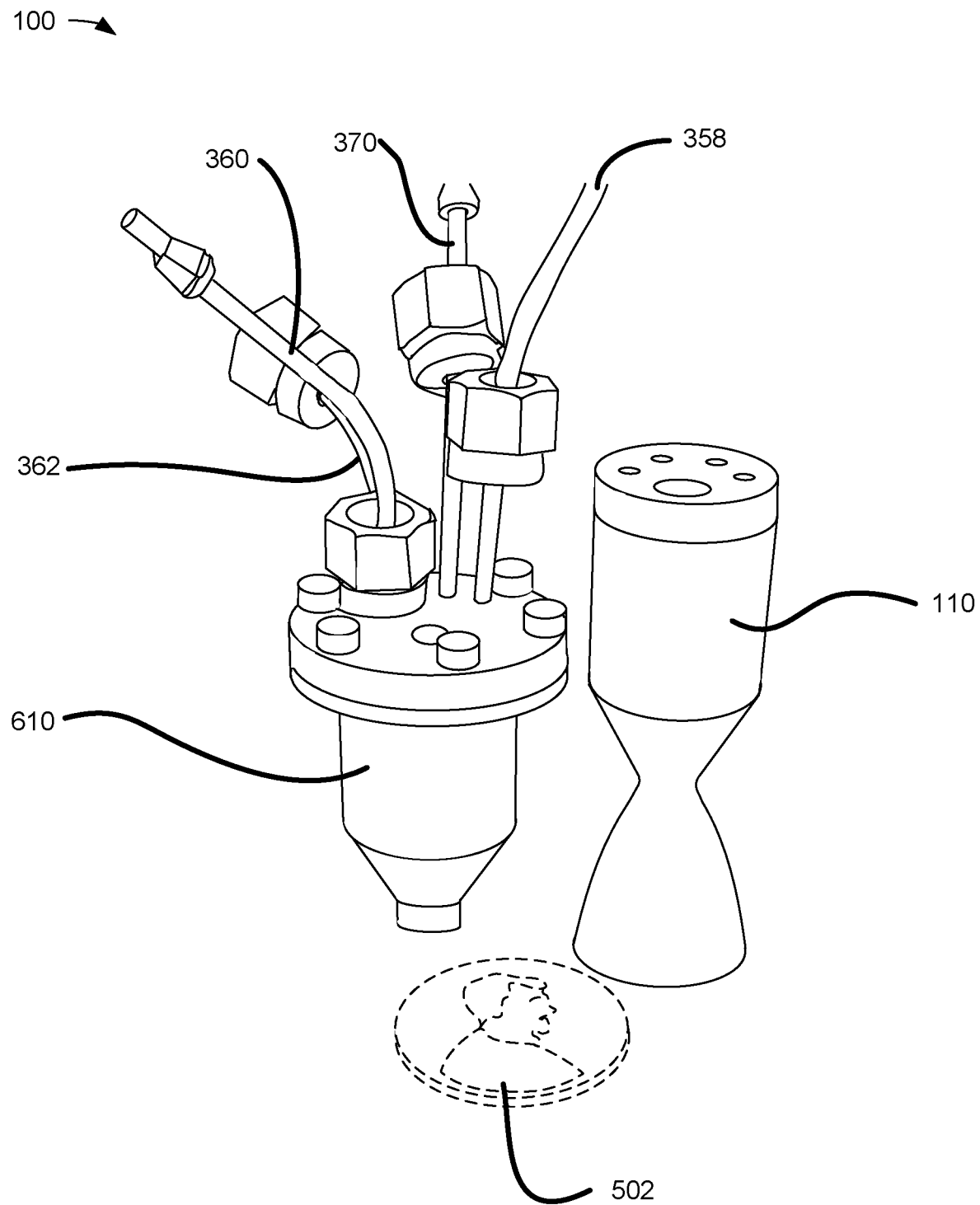
FIG. 7 is an additional perspective view illustrating an exemplary embodiment of the rocket motor and the thrust chamber test article in the small satellite propulsion system, according to a preferred embodiment of the present invention.

FIG. 7 is an additional perspective view illustrating an exemplary embodiment of the rocket motor 110 and the thrust chamber test article 610 in the small satellite propulsion system 300, according to a preferred embodiment of the present invention. Thrust chamber test article 610 is again shown with the four pipes (the rocket motor pressure transducer data line 370, the GOX controlled line 360, the GCH4 controlled line 358, and the coolant controlled flow line 362 (barely visible)) and nuts and a flanged support for the plumbing.

Figure 8:
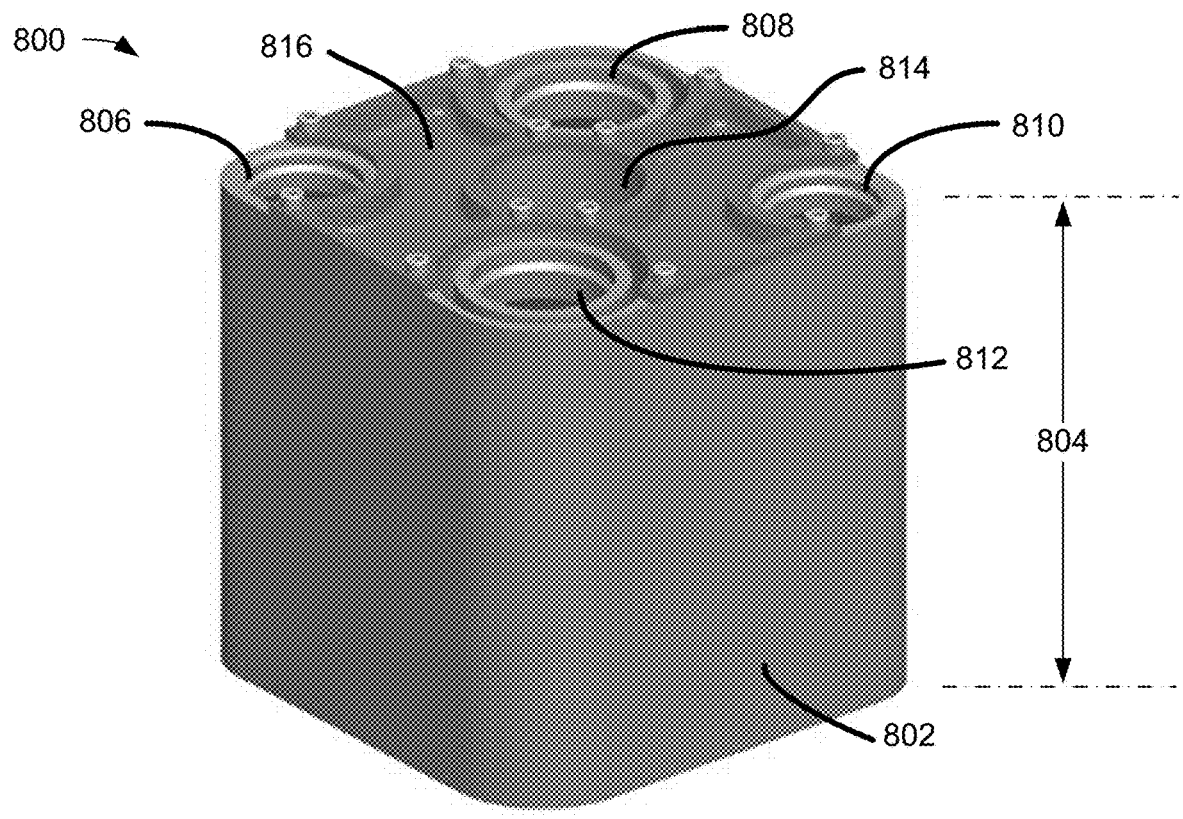
FIG. 8 is a perspective view illustrating an exemplary structure of a second embodiment of a small satellite propulsion system, according to a preferred embodiment of the present invention.

FIG. 8 is a perspective view illustrating an exemplary structure 802 of a second embodiment of a small satellite propulsion system 800, according to a preferred embodiment of the present invention. Structure 802 encloses linear GCH4 tanks 806 and 810, linear GOX tanks 808 and 812, and a thruster cavity 814. Thruster cavity 814 is an elongated enclosure having at least one wall that is formed, at least in part, by coolant tanks 904 (see FIG. 9). Top plate 816 is fastened to the structure 802. Structure 802 has a height 804 which, in the present exemplary embodiment, is four inches.

Figure 9:
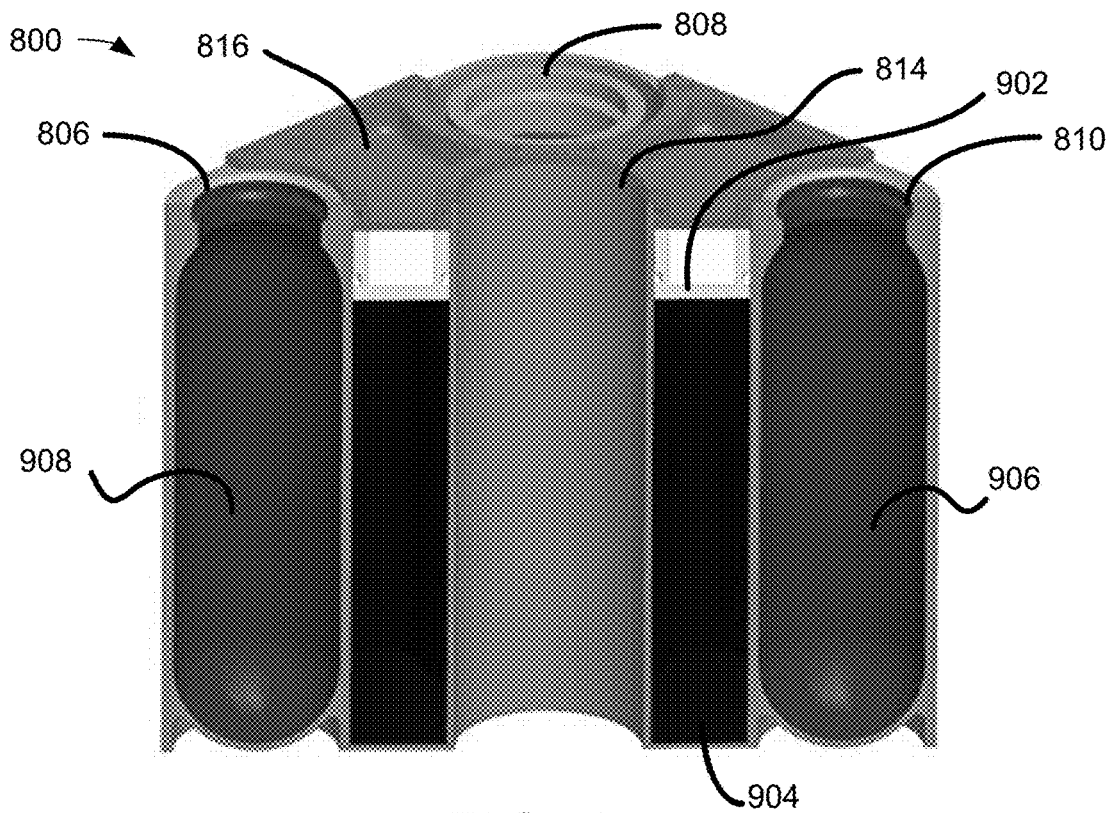
FIG. 9 is a perspective cross-sectional view illustrating the exemplary structure of the second embodiment of a small satellite propulsion system of FIG. 8, according to a preferred embodiment of the present invention.

FIG. 9 is a perspective cross-sectional view illustrating the exemplary structure 802 of the second embodiment of a small satellite propulsion system 800 of FIG. 8, according to a preferred embodiment of the present invention. Inner tank walls 906 and 908 of linear GCH4 tanks 810 and 806, respectively, can be seen. Linear coolant tanks, 904 (one of two labeled) is shown with GCH4-driven piston 902 (one of two labeled). Linear coolant tanks, 904 (one of two labeled) are positioned between GCH4 tank 810 and thruster cavity 814 and between GCH4 tank 806 and thruster cavity 814. Linear coolant tanks, 904 (one of two labeled) are fluidically connected (not shown).

Figure 10:
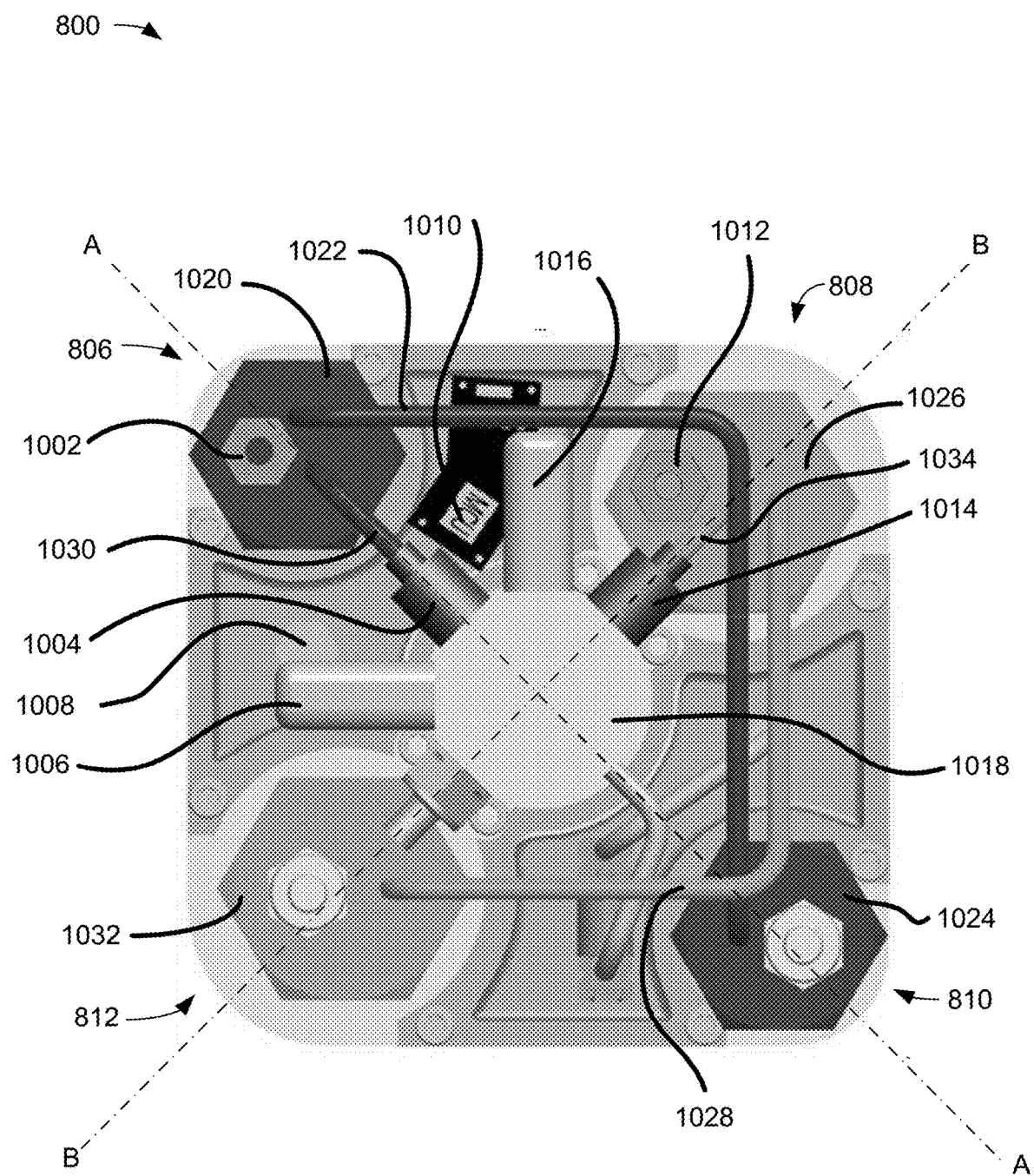
FIG. 10 is a top plan view illustrating the exemplary second embodiment of a small satellite propulsion system of FIG. 8 and defining cross-sections AA and BB, according to a preferred embodiment of the present invention.

FIG. 10 is a top plan view illustrating the exemplary second embodiment of a small satellite propulsion system 800 of FIG. 8 and defining cross-sections AA and BB, according to a preferred embodiment of the present invention. Section AA is through GCH4 tanks 806 and 810 at two opposing corners of structure 802 and Section BB is through GOX tanks 808 and 812 at the other two opposing corners of structure 802.

GCH4 fill valve 1002 (similar to GCH4 fill valve 114) receives GCH4 prior to launch to fill GCH4 tanks 806 and 810 through GCH4 tank closures 1020 and 1024, respectively. Tank 806 and tank 810 are fluidically connected via GCH4 line 1022 extending through first tank closure 1020 into second tank closure 1024, respectively. GCH4 from GCH4 tanks 806 and 810 flows via GCH4 output line 1030 and GCH4 regulator valve 1004 into manifold 1018 when GCH4 isolation valve 1006 (similar to GCH4 isolation valve 322) is open. From GCH4 isolation valve 1006, GCH4 flows to GCH4 run valve 1102 (see FIG. 11) and then into injector 204 of rocket motor 110 in thruster cavity 814. Note that the GCH4 flow illustrated in FIG. 10 differs from the embodiment of FIG. 3.

GOX fill valve 1012 (similar to valve 112) receives GOX prior to launch to fill GOX tanks 808 and 812 through GOX tank closures 1026 and 1032, respectively. GOX tank 808 and GOX tank 812 are fluidically connected via GOX line 1028 extending through first GOX tank closure 1026 into second GOX tank closure 1032, respectively. GOX from GOX tanks 808 and 812 flows to GOX regulator valve 1014 (similar to GOX gas regulation valve 308) via GOX output line 1034 and into manifold 1018 via when GOX isolation valve 1016 (similar to isolation valve 202) is open. From GOX isolation valve 1016, GOX flows to GOX run valve 1202 (see FIG. 12) and then into injector 204 of rocket motor 110 in thruster cavity 814

Computer interface 1010 provides a connection point for a control computer communication line (not shown). The control computer, which may be one of many programs running on a single non-dedicated computer or a dedicated computational resource, operates the valves and receives status and sensor data from the small satellite propulsion system 800. The control computer implements both pre-deployment and operational actions of the small satellite propulsion system 800.

Figure 11:
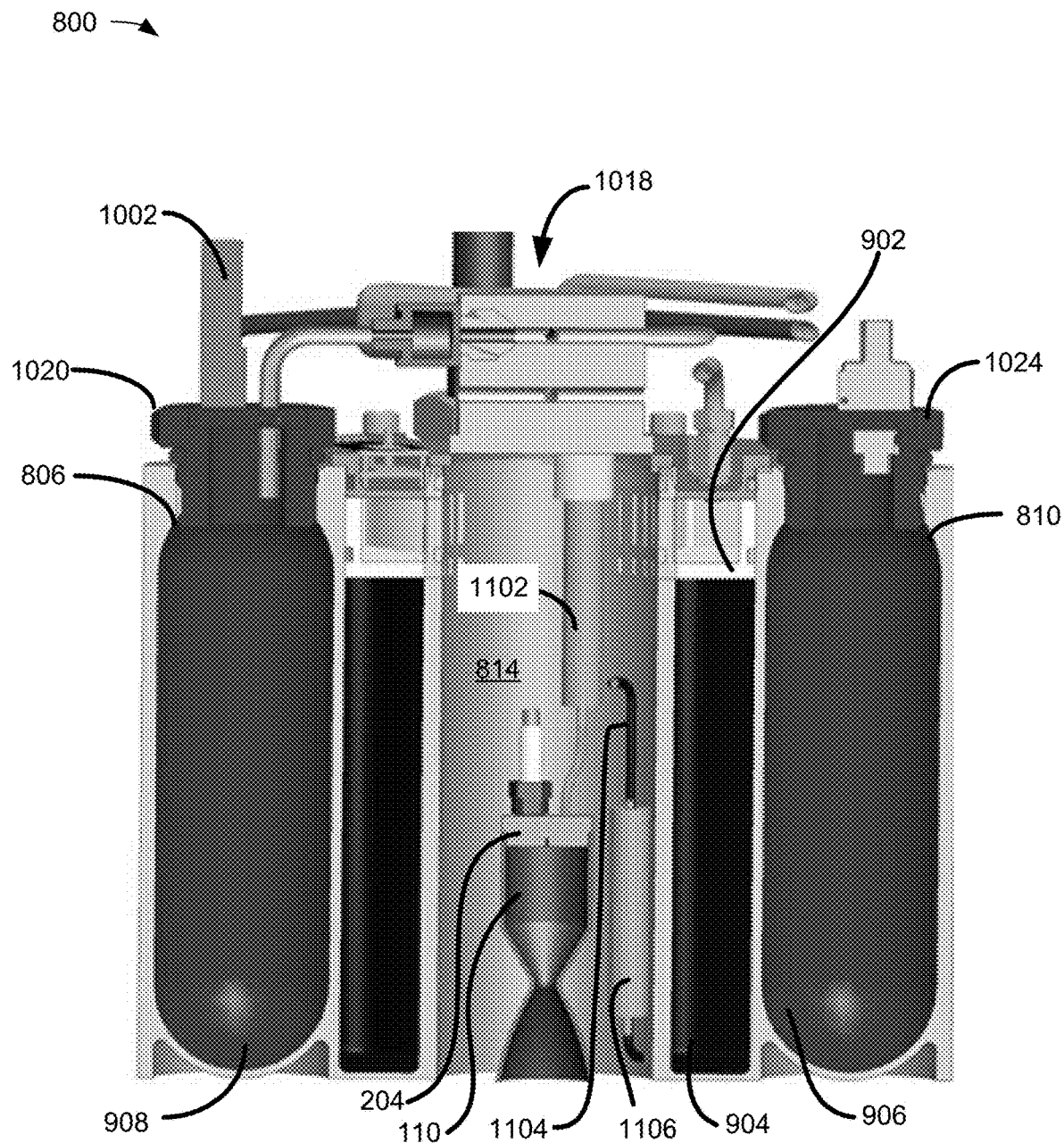
FIG. 11 is an elevation cross-sectional view, through cross section AA defined in FIG. 10, illustrating the exemplary second embodiment of a small satellite propulsion system of FIG. 8, according to a preferred embodiment of the present invention.

FIG. 11 is an elevation cross-sectional view, through cross section AA defined in FIG. 10, illustrating the exemplary second embodiment of a small satellite propulsion system 800 of FIG. 8, according to a preferred embodiment of the present invention. GCH4 run valve 1102 (similar to GCH4 run valve 326) from the manifold 1018 into the thruster cavity 814. Coolant run valve 1106 (similar to coolant run valve 354) is located in the thruster cavity 814 where it receives coolant thought the coolant tank sidewall. GCH4 flows through the controlled line from the GCH4 run valve 1102 to the injector 204. Coolant controlled flow line 1104 (similar to coolant controlled flow line 362) is connected (not shown, but see FIG. 12) to injector 204. Linear GCH4 tanks 806 and 810 have respective GCH4 first and second tank closures 1020 and 1024 installed. Coolant tanks 904 (one of two labeled) are fluidically connected (not shown) for liquid coolant at the tank bottoms and for GCH4 pressure at the tank tops.

Figure 12:
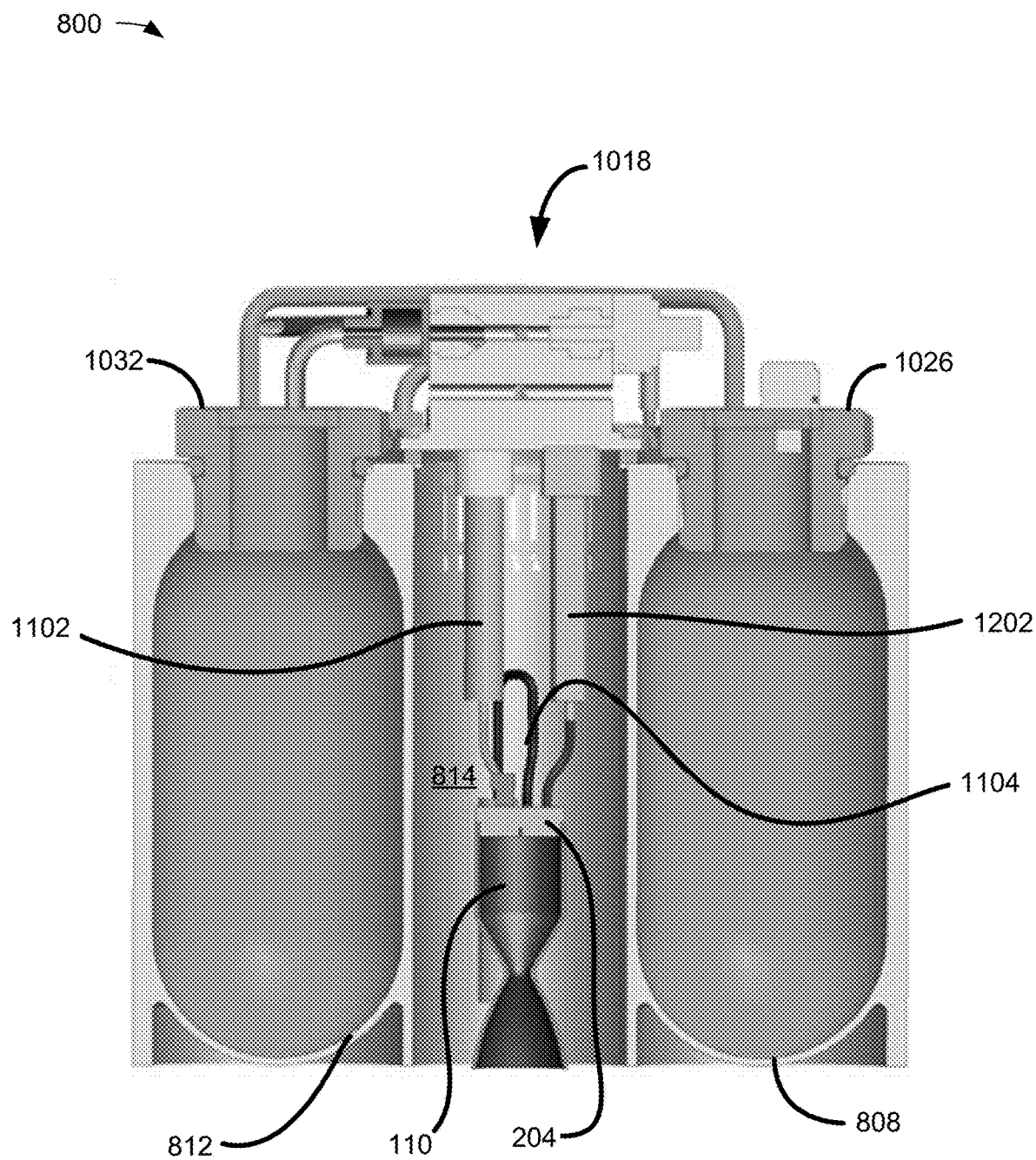
FIG. 12 is an elevation cross-sectional view, through cross section BB defined in FIG. 10, illustrating the exemplary second embodiment of a small satellite propulsion system of FIG. 8, according to a preferred embodiment of the present invention.

FIG. 12 is an elevation cross-sectional view, through cross section BB defined in FIG. 10, illustrating the exemplary second embodiment of a small satellite propulsion system 800 of FIG. 8, according to a preferred embodiment of the present invention. GOX tanks 808 and 812 are shown with tank closures 1026 and 1032 installed, respectively. GOX run valve 1202 (similar to GOX run valve 208) extends from the manifold 1018 into the thruster cavity 814, as does GCH4 run valve 1102. Rocket motor 110 is mechanically fixed within thruster cavity 814.

I claim:
1. A small satellite propulsion system comprising:
   a. a gaseous fuel tank;
   b. a gaseous oxidizer tank;
   c. a liquid coolant tank;
   d. a rocket motor in valve-controlled fluid communication with said gaseous fuel tank, said gaseous oxidizer tank, and said liquid coolant tank, wherein said rocket motor is fixed within an elongated enclosure comprising at least one side formed, at least in part, by at least one of said gaseous fuel tank, said gaseous oxidizer tank, and said liquid coolant tank; and
   e. wherein said valve-controlled fluid communication comprises at least one of:
      i. gas valve-controlled fluid communication with said rocket motor, further comprising:
         1. first and second isolation valves in fluid communication with said respective gaseous oxidizer and gaseous fuel tanks;
         2. first and second gas regulation valves in fluid communication with said first and second respective isolation valves;
         3. first and second run valves in fluid communication with said first and second respective gas regulation valves;
         4. first and second check valves in fluid communication with said first and second respective run valves;
         5. first and second flow venturies in fluid communication with said first and second respective check valves; and
         6. a rocket motor injector in fluid communication with said first and second flow venturies;
      ii. gas valve-controlled fluid communication with said attitude control system thrusters, further comprising:
         1. said second isolation valve;
         2. said second gas regulation valve;
         3. four thruster run valves in fluid communication with said second gas regulation valve; and
         4. four thrusters in fluid communication with said respective four thruster run valves;
      iii. gas valve-controlled fluid communication with said coolant tank, further comprising:
         1. said second isolation valve;
         2. said second gas regulation valve;
         3. a pressurant run valve in fluid communication with said second gas regulation valve; and
         4. a pressurant side of said piston in said coolant tank in fluid communication with said pressurant run valve; and
      vi. liquid valve-controlled fluid communication, further comprising
         1. a third isolation valve in fluid communication with said coolant tank;
         2. a third run valve in fluid communication with said third isolation valve;
         3. a third check valve in fluid communication with said third run valve; and
         4. said rocket motor injector in fluid communication with said third check valve.

2. The small satellite propulsion system of claim 1, comprising a piston in said liquid coolant tank, responsive to a pressurant on a first side of said piston to exert pressure on a liquid coolant in said liquid coolant tank when said small satellite propulsion system is fueled, filled, and activated.

3. The small satellite propulsion system of claim 2, comprising valve-controlled fluid communication between said gaseous fuel tank and said liquid coolant tank adapted to supply gaseous fuel as said pressurant when said small satellite propulsion system is fueled, filled, and activated.

4. The small satellite propulsion system of claim 1, comprising valve-controlled fluid communication between said gaseous fuel tank and an attitude control system adapted to use gaseous fuel in cold-gas attitude control system thrusters when said small satellite propulsion system is fueled, filled, and activated.

5. The small satellite propulsion system of claim 1, wherein said gaseous fuel comprises gaseous methane, said gaseous oxidizer comprises gaseous oxygen, and said liquid coolant comprises ethanol and water.

6. The small satellite propulsion system of claim 1, wherein said liquid coolant tank contains a pressure no greater than 1.2 atmospheres when said small satellite propulsion system is fueled and filled.

7. The small satellite propulsion system of claim 1, wherein said gaseous fuel tank, said gaseous oxidizer tank, and said liquid coolant tank together contain no more than 100 Watt-hours of chemical energy when said small satellite propulsion system is fueled and filled.

8. The small satellite propulsion system of claim 1, comprising no pyrotechnics.

9. The small satellite propulsion system of claim 1, comprising no hazardous toxic materials when said gaseous fuel tank, said gaseous oxidizer tank, and said liquid coolant tank are filled.

10. A small satellite propulsion system comprising:
   a. a gaseous fuel tank;
   b. a gaseous oxidizer tank;
   c. a liquid coolant tank;
   d. a rocket motor in valve-controlled fluid communication with said gaseous fuel tank, said gaseous oxidizer tank, and said liquid coolant tank, wherein said rocket motor is fixed within an elongated enclosure comprising at least one side formed, at least in part, by at least one of said gaseous fuel tank, said gaseous oxidizer tank, and said liquid coolant tank;
   e. a piston in said liquid coolant tank, responsive to a pressurant on a first side of said piston to exert pressure on a liquid coolant in said liquid coolant tank when said small satellite propulsion system is fueled, filled, and activated; and
   f. valve-controlled fluid communication between said gaseous fuel tank and said liquid coolant tank adapted to supply gaseous fuel as said pressurant when said small satellite propulsion system is fueled, filled, and activated.

11. The small satellite propulsion system of claim 10, comprising valve-controlled fluid communication between said gaseous fuel tank and an attitude control system adapted to use gaseous fuel in cold-gas attitude control system thrusters when said small satellite propulsion system is fueled, filled, and activated.

12. The small satellite propulsion system of claim 10, wherein said gaseous fuel tank, said gaseous oxidizer tank, and said liquid coolant tank each contains a pressure no greater than 1.2 atmospheres when said small satellite propulsion system is fueled and filled.

13. The small satellite propulsion system of claim 10, wherein said gaseous fuel comprises gaseous methane, said gaseous oxidizer comprises gaseous oxygen, and said liquid coolant comprises ethanol and water.

14. The small satellite propulsion system of claim 10, wherein said gaseous fuel tank, said gaseous oxidizer tank, and said liquid coolant tank together contain no more than 100 Watt-hours of chemical energy when fueled and filled.

15. The small satellite propulsion system of claim 10, comprising:
   a. no pyrotechnics; and
   b. no hazardous toxic materials when said gaseous fuel tank, said gaseous oxidizer tank, and said liquid coolant tank are fueled and filled.

16. The small satellite propulsion system of claim 10, wherein said valve-controlled fluid communication comprises at least one of:
   a. gas valve-controlled fluid communication, further comprising:
      i. first and second isolation valves in fluid communication with said respective gaseous oxidizer and gaseous fuel tanks;
      ii. first and second gas regulation valves in fluid communication with said first and second respective isolation valves;
      iii. first and second run valves in fluid communication with said first and second gas regulation valves;
      iv. first and second check valves in fluid communication with said first and second run valves;
      v. first and second flow venturies in fluid communication with said first and second check valves; and
      vi. a rocket motor injector in fluid communication with said first and second flow venturies; and
   b. liquid valve-controlled fluid communication
      i. a third isolation valve in fluid communication with said coolant tank;
      ii. a third run valve in fluid communication with said third isolation valve;
      iii. a third check valve in fluid communication with said third run valve; and
      iv. said rocket motor injector in fluid communication with said third check valve.

17. A small satellite propulsion system comprising:
   a. a gaseous fuel tank;
   b. a gaseous oxidizer tank;
   c. a liquid coolant tank;
   d. a rocket motor in valve-controlled communication with said gaseous fuel tank, said gaseous oxidizer tank, and said liquid coolant tank, wherein said rocket motor is fixed within an elongated enclosure comprising at least one side formed, at least in part, by at least one of said gaseous fuel tank, said gaseous oxidizer tank, and said liquid coolant tank;
   e. a piston in said liquid coolant tank, responsive to a pressurant on a first side of said piston to exert pressure on a liquid coolant in said liquid coolant tank when said small satellite propulsion system is fueled, filled, and activated;
   f. valve-controlled fluid communication between said gaseous fuel tank and said liquid coolant tank adapted to supply gaseous fuel as said pressurant when said small satellite propulsion system is fueled, filled, and activated; and
   g. valve-controlled fluid communication between said gaseous fuel tank and an attitude control system adapted to use gaseous fuel in cold-gas attitude control system thrusters when said small satellite propulsion system is fueled, filled, and activated.

18. The small satellite propulsion system of claim 17, wherein said valve-controlled fluid communication comprises at least one of:
  a. gas valve-controlled fluid communication with said rocket motor, further comprising:
    i. first and second isolation valves in fluid communication with said respective gaseous oxidizer and gaseous fuel tanks;
    ii. first and second gas regulation valves in fluid communication with said first and second respective isolation valves;
    iii. first and second run valves in fluid communication with said first and second respective gas regulation valves;
    iv. first and second check valves in fluid communication with said first and second respective run valves;
    v. first and second flow venturies in fluid communication with said first and second respective check valves; and
    vi. a rocket motor injector in fluid communication with said first and second flow venturies;
  b. gas valve-controlled fluid communication with said attitude control system thrusters, further comprising:
    i. said second isolation valve;
    ii. said second gas regulation valve;
    iii. four thruster run valves in fluid communication with said second gas regulation valve; and
    iv. four thrusters in fluid communication with said respective four thruster run valves;
  c. gas valve-controlled fluid communication with said coolant tank, further comprising:
    i. said second isolation valve;
    ii. said second gas regulation valve;
    iii. a pressurant run valve in fluid communication with said second gas regulation valve; and
    iv. a pressurant side of said piston in said coolant tank in fluid communication with said pressurant run valve; and
  d. liquid valve-controlled fluid communication, further comprising
    i. a third isolation valve in fluid communication with said coolant tank;
    ii. a third run valve in fluid communication with said third isolation valve;
    iii. a third check valve in fluid communication with said third run valve; and
    iv. said rocket motor injector in fluid communication with said third check valve.

19. The small satellite propulsion system of claim 17, wherein
  a. said gaseous fuel tank, said gaseous oxidizer tank, and said liquid coolant tank each contains a pressure no greater than 1.2 atmospheres when said small satellite propulsion system is fueled and filled;
  b. said gaseous fuel tank, said gaseous oxidizer tank, and said liquid coolant tank together contain no more than 100 Watt-hours of chemical energy when small satellite propulsion system is fueled and filled;
  c. small satellite propulsion system comprises:
    i. no pyrotechnics; and
    ii. no hazardous toxic materials.

* * * * *